United States Patent [19]

Whirley et al.

[11] Patent Number: 5,681,057
[45] Date of Patent: Oct. 28, 1997

[54] CRASH ENERGY-MANAGEMENT STRUCTURE

[75] Inventors: Robert G. Whirley, Santa Rosa; Bruce E. Engelmann, Sebastopol, both of Calif.

[73] Assignee: U.S. Electricar, Santa Rosa, Calif.

[21] Appl. No.: 632,345

[22] Filed: Apr. 10, 1996

Related U.S. Application Data

[63] Continuation of Ser. No. 390,573, Feb. 17, 1995, abandoned.

[51] Int. Cl.$^6$ .............................. B60K 1/04; B62D 21/15
[52] U.S. Cl. .................. 280/784; 180/68.5; 296/188; 296/189
[58] Field of Search .................... 280/784, 781, 280/748; 180/68.5, 65.1, 274; 296/188, 189, 194, 204, 205; 188/377

[56] References Cited

U.S. PATENT DOCUMENTS

| | | | |
|---|---|---|---|
| 519,602 | 5/1894 | Elieson . | |
| 1,648,536 | 11/1927 | Brumbaugh | 180/68.5 |
| 2,257,835 | 10/1941 | Best | 280/106 |
| 2,296,181 | 9/1942 | Perkins | 180/64 |
| 3,391,752 | 7/1968 | Albright | 180/65 |
| 3,477,538 | 11/1969 | Hall et al. | 180/65 |
| 3,493,068 | 2/1970 | Albright | 180/65 |
| 3,616,872 | 11/1971 | Taylor | 180/65 R |
| 3,655,237 | 4/1972 | Pitman | 296/28 R |
| 3,821,998 | 7/1974 | Hollins | 180/68.5 |
| 3,881,742 | 5/1975 | Felzer | 280/106 R |
| 3,902,916 | 9/1975 | Warszawski | 136/86 A |
| 3,983,952 | 10/1976 | McKee | 180/65 R |
| 4,040,640 | 8/1977 | Begg | 280/106 R |
| 4,044,852 | 8/1977 | Lewis et al. | 180/68.5 |
| 4,058,182 | 11/1977 | Huber | 180/68.5 |
| 4,120,511 | 10/1978 | Allen et al. | 280/795 |
| 4,135,593 | 1/1979 | Fowkes | 180/65 R |
| 4,165,794 | 8/1979 | Warner et al. | 180/65 R |
| 4,174,014 | 11/1979 | Bjorksten | 180/68.5 |
| 4,216,839 | 8/1980 | Gould et al. | 180/65 R |
| 4,232,755 | 11/1980 | Dow | 280/784 |
| 4,248,323 | 2/1981 | Gaffney | 180/291 |
| 4,267,895 | 5/1981 | Eggert, Jr. | 180/54 A |
| 4,339,015 | 7/1982 | Fowkes et al. | 180/65 R |
| 4,342,533 | 8/1982 | Hane | 414/396 |
| 4,365,681 | 12/1982 | Singh | 180/68.5 |
| 4,726,440 | 2/1988 | Kamlukin et al. | 180/312 |
| 5,005,864 | 4/1991 | Cachere | 280/800 |
| 5,015,545 | 5/1991 | Brooks | 429/99 |
| 5,048,888 | 9/1991 | Willy et al. | 296/189 |
| 5,074,587 | 12/1991 | Schwede et al. | 280/781 |
| 5,156,225 | 10/1992 | Murrin | 180/65.1 |
| 5,364,128 | 11/1994 | Ide | 280/784 |

FOREIGN PATENT DOCUMENTS

| | | | |
|---|---|---|---|
| 559176 | 9/1993 | European Pat. Off. | 280/784 |
| 31 41 164 | 4/1983 | Germany | 180/68.5 |
| 58-105883 | 6/1983 | Japan | 296/188 |
| 6-32247 | 2/1994 | Japan | 180/68.5 |

*Primary Examiner*—Brian L. Johnson
*Assistant Examiner*—Peter C. English
*Attorney, Agent, or Firm*—Burns, Doane, Swecker & Mathis, L.L.P.

[57] ABSTRACT

An electric-powered vehicle or a vehicle converted from internal combustion power to electrical power is provided having increased crashworthiness. The present invention provides crash energy management structures for such vehicles to achieve the increased crashworthiness. Because of the additional mass added to such vehicles by an energy source containment unit and the associated batteries, the crash energy management structure functions either to prevent an energy source containment unit from moving forward as a result of a collision or to enhance the strength of the crumple zone, or both, whether the vehicle is of monocoque construction, frame construction, or some combination thereof.

16 Claims, 3 Drawing Sheets

CRASH ENERGY-MANAGEMENT STRUCTURE

This application is a continuation of application Ser. No. 08/390,573, filed Feb. 17, 1995, abandoned.

FIELD OF THE INVENTION

The present invention is directed to a structure for installing in an electrically-powered vehicle to improve its crashworthiness, more particularly, to a novel structure for an electric-powered vehicle or a vehicle converted from internal combustion engine power to electric power which prevents a battery containment structure from moving forward in the event of a frontal crash. Alternatively or in addition, the structure can augment the crumple zone of the electric vehicle or the converted vehicle.

BACKGROUND OF THE INVENTION

In recent years, significant effort has gone into developing electrically-powered vehicles having performance competitive with internal combustion engine driven vehicles. In addition, the need to reduce or entirely avoid the air pollution caused by internal combustion engines has created an even greater necessity for electrically-powered vehicles.

A primary limitation on the range, acceleration, and other performance characteristics of electric vehicles is the stored energy-to-weight ratio for battery-driven vehicles. The stored energy-to-weight ratio is low for such vehicles because batteries have a lower energy density and yield less energy than hydrocarbon fuels of similar initial weight. Battery weight arises from two primary factors: first, batteries usually are heavy in their own right because they use lead plates or other heavy metal components. Second, other structural components of electrically-powered vehicles are heavier than internal combustion engine-powered vehicles because the structure of the former must carry the additional weight of the batteries.

In addition to the energy-to-weight ratio, a number of considerations are important in developing viable electrically-powered vehicles, especially automobiles. For example, such electrically-powered automobiles must be sufficiently large and rugged to move in traffic with conventionally powered automobiles, the electrically-powered automobiles must have sufficient speed and acceleration to travel safely with conventionally powered automobiles, and must have a sufficient range of operation on one charge of their batteries to be suitable for general urban use.

Other considerations are also important: the batteries must be accessible for servicing and replacement; the vehicle must exhibit a low center of gravity to have acceptable stability when driving on curves; vehicular weight distribution should be concentrated near the center of the vehicle for optimal road handling characteristics; the batteries should be located below the passenger level for safety during collisions; and the batteries require structural containment within the vehicle structure to prevent electrolyte or other battery contents from being randomly spilled or ejected should batteries rupture in a collision.

Another important consideration in the development of viable electrically-powered vehicles is the ability to convert internal combustion engine-powered automobiles to electrically-powered automobiles. To that end, it is desirable to have a removable energy source containment unit that can replace, or augment, an existing structural element (such as a frame member or body panel of a vehicle) so that the weight of the energy source containment unit is partially offset when the existing structural members are removed or the energy source containment unit contributes advantageously to the overall strength and stiffness of the vehicle.

One of the concerns of converted vehicles is the effect of the conversion on the crashworthiness (i.e., the ability of occupants to survive a collision) of the converted vehicle. There are generally two threats to the occupants of a vehicle in the event of a collision: intrusion upon the occupant's compartment and accelerations imparted to the occupants by rapid deceleration of the vehicle. Intrusion pertains to structure collapsing around or moving toward the occupant such that the occupant is crushed or injured by the structure. For example, the occupant's seat moving toward the firewall of the vehicle or the engine penetrating the firewall and impacting the occupant. Acceleration pertains to the rapid deceleration of the vehicle when it impacts an object which causes the occupants to experience shock damage. Human physiology does not permit a person to be decelerated too rapidly. Air Force experiments indicate that a sustained acceleration of 10 G (i.e., ten times the value of gravity) is a permissible limit. For the purposes of the general public, 7 G is a more realistic target. During the short transient of a vehicle crash, much higher values can be safely sustained in the vehicle structure if the occupants are properly protected by seat belts, airbags, and padded vehicle interiors.

The crashworthiness of an electric vehicle or a converted vehicle is reduced by the additional mass of the batteries and the mass of the structure necessary to support the batteries. It is generally known that the forward structure of an internal combustion engine-powered vehicle converts energy by deformation in the event of a frontal impact so as to decelerate the vehicle at a survivable rate. With the additional mass of the batteries and the battery support structure, the existing vehicle structure becomes "too soft" to decelerate the vehicle at the survivable rate. For example, in a front end collision, the additional mass creates higher forces on the "crumple zone" (or "crush zone") consisting of the forward bodywork, bumper, rails, wheels, etc. Because the "crumple zone" of a vehicle is designed based on the original vehicle mass, any additional mass added to the vehicle causes the vehicle to deform (i.e., crumple, crush, etc.) too easily. The result is that the vehicle and occupants experience very little deceleration as the original crumple zone collapses, then experience either very large, unsurvivable decelerations as the vehicle and occupants come to an abrupt stop when the crumple zone has completely collapsed or excessive intrusion as the payload compartment crushes into the target object.

Therefore, in accordance with the ability to convert internal combustion engine-powered automobiles to electrically-powered automobiles, it is desirable to have a crash energy management structure that augments the existing structural element (such as a frame member or body panel of a vehicle) so that the vehicle will have enhanced crashworthiness and again decelerate the vehicle at a survivable rate. Likewise, it is desirable to have a crash energy management structure incorporated into the original design of an electric-powered vehicle.

Unfortunately, electrically-powered vehicles that have been suggested by workers in the prior art have not satisfied all of the design considerations discussed above. For instance, U.S. Pat. Nos. 5,156,225 to Murrin, and 3,493,068 and 3,391,752 to Albright each disclose an electrically-powered vehicle wherein a specially configured battery itself acts as a primary load-bearing member of the vehicle, but none of these patents discloses the use of a crash energy management structure to enhance a converted vehicles crashworthiness. Similarly, U.S. Pat. No. 3,655,237 to Pitman, U.S. Pat. No. 3,881,742 to Felzer, U.S. Pat. No. 4,174,014 to Bjorksten, and U.S. Pat. No. 5,364,128 to Ide each disclose crash energy management-type structures, but none of these patents discloses the use of a structure that prevents a battery containment structure from moving forward in the event of a frontal crash and/or enhances the crumple zone of a vehicle converted from internal combustion engine power to electrical power.

Definitions:

The term axle herein refers to a pair of single or dual wheels physically connected by a tube, shaft, or beam or the like that rotate about a common axis or a pair of single or dual wheels that rotate about spindles, stub axles or split shafts or the like, which, save for suspension travel or steering motion, are nominally on a common axis but are not directly physically connected.

The term battery herein refers to an energy storage unit which converts chemical or other forms of energy into electrical energy such as a chemical storage cell or cells or a flywheel storage unit, or a battery is a unit which converts chemical energy into electrical energy even when the chemical energy is not initially stored in the unit, such as a fuel cell. A battery is any energy storage or conversion device that could be contained in the energy source containment structure.

The term flame herein refers to a structural portion of a vehicle consisting of beams or elements serving as beams joined together to form a structure to which the running gear and body may be attached and through which suspension and drive loads may be reacted.

The term monocoque herein refers to a vehicle body or portion of a vehicle body consisting of a torsionally stiff shell, possibly containing local stiffening members, in which suspension and drive loads are reacted through the panels and structure of the torsionally stiff body. Sometimes the term monocoque refers to an integral or unitary body.

The term payload compartment herein refers to the volume intended to contain passengers or cargo or both, or a multiplicity of volumes each of which is meant to contain passengers or payload or both.

The term vehicle primary structure herein refers to that portion of the vehicle structure, whether the vehicle is of frame construction, monocoque construction or some combination thereof, that is supported by the tires, wheels and axles of the vehicle.

The term forward primary structure herein refers to that portion of the vehicle structure, whether the vehicle is of frame construction, monocoque construction or some combination thereof, that is forward of the payload compartment.

The term crush zone or crumple zone herein refers to the structure intended to deform and absorb energy in a collision of the vehicle with stationary or moveable objects contacting the vehicle at the structural zone. The crush or crumple zone can be an integral part of the vehicle primary structure.

The term crush force herein refers to the amount of force that the vehicle and vehicle structure exert on an object during a collision while the vehicle is crumpling and deforming. Crush force (F) equals the vehicle mass (m) times the acceleration (a) of the vehicle (i.e., F=mxa).

The term electrically-powered vehicle herein refers to vehicles initially designed as electric vehicles and to vehicles that have been converted from internal combustion power to electrical power.

SUMMARY OF THE INVENTION

The present invention, generally speaking, provides crash energy management structures for vehicles initially designed as electric-powered vehicles or vehicles that have been converted from internal combustion power to electrical power. Because of the additional mass added to the vehicle by an energy source containment unit and the associated batteries, the crash energy management structure functions either to prevent an energy source containment unit from moving forward as a result of a collision or to enhance the strength of the crumple zone, or both, whether the vehicle is of monocoque construction, frame construction, or some combination thereof.

The crash energy management structure can be a unit that only prevents the energy source containment unit from moving or the crash energy management structure can be a unit that only enhances the strength of the crumple zone. Preferably, however, the crash energy management structure is a combination unit that accomplishes both functions.

For example, in one embodiment of an electrically-powered vehicle having a crash energy management structure according to the present invention, the crash energy management structure is positioned to prevent the energy source containment unit from moving relative to the payload compartment in the event the vehicle impacts an object. The crash energy management structure in such an instance is located either adjacent to the front or rear, or both, of the energy source containment unit and is anchored to a rigid portion of the vehicle primary structure. The crash energy management structure is designed with sufficient strength and stiffness to prevent the energy source containment unit and batteries from moving forward in the event of a crash. Preferably, the crash energy management structure in this embodiment is located below the payload compartment, between the wheels and substantially outside the crush zone.

In another embodiment of an electrically-powered vehicle having a crash energy management structure according to the present invention, the crash energy management structure is positioned to augment the strength of the crush zone of the vehicle. The crash energy management structure in such an instance is located either adjacent to or in the crush zone, or both, and anchored to a rigid portion of the vehicle primary structure. The crash energy management structure is designed with a measured (i.e., predetermined) strength and stiffness so as to increase the crush force of the vehicle in the event the vehicle impacts an object. Preferably, the crash energy management structure in this embodiment is located forward of the payload compartment, between the wheels and substantially inside the crush zone.

In yet another embodiment of an electrically-powered vehicle having a crash energy management structure according to the present invention, the crash energy management structure accomplishes both functions just described. In this instance, the crash energy management structure is positioned to both prevent the energy source containment unit from moving and to augment the strength of the crush zone of the vehicle. In this embodiment, the crash energy management structure can be two separate units, two joined units, or one integrated unit.

Generally speaking, an electrically-powered vehicle has a forward axle and an aft axle, (i.e., pair of transverse axles spaced from one another in the direction of travel) with the vehicle primary structure extending between the transverse axles. A payload compartment is positioned above at least part of the vehicle primary structure. In accord with the present invention, the energy source containment unit can be an integral element of the vehicle primary structure, enclose a battery or plurality of batteries and be located below the level of the payload compartment. With this arrangement, the energy source containment unit can be substituted for or augment a part of the vehicle primary structure, whether that vehicle primary structure be a frame or a monocoque structure. That placement of the energy source containment unit further protects the unit from collisions, both fore-and-aft and lateral ones, because the unit is centrally disposed relative to the envelope defined by the vehicle.

BRIEF DESCRIPTION OF THE DRAWINGS

The present invention can be further understood with reference to the following description in conjunction with the appended drawings, wherein like elements are provided with the same reference numerals. In the drawings.

DETAILED DESCRIPTION OF THE PREFERRED EMBODIMENTS

The crash energy management structure of the present invention basically encompasses two general principles: supplement the strength of the crush zone of a vehicle so that even with the added mass of the energy source containment unit and the batteries, the vehicle will decelerate in the event of a frontal crash at an occupant survival rate; and prevent an energy source containment unit with batteries contained therein from moving with respect to the vehicle to which they are attached in the event of a collision. In some instances, only the first of these two principles must be addressed during the original design or conversion process. In those instances, the crash energy management structure can be the embodiment of the present invention shown generally at 3 or its equivalent and which will be referred to as the deformable crash energy management structure. In other instances, only the second of these two principles must be addressed during the original design or conversion process. In those instances, the crash energy management structure can be the embodiment of the present invention shown generally at 7 or its equivalent and which will be referred to as the rigid crash energy management structure. In yet other instances, both of these principles must be addressed during the conversion process. In those instances, the crash energy management structure can be the embodiment of the present invention shown generally at 10 or its equivalent which consists of a combination of a deformable crash energy management structure and a rigid crash energy management structure.

In order to understand the advantages and construction of the crash energy management structure of the present invention, a brief discussion will be given regarding the original design or conversion of a vehicle 5 and one embodiment of the necessary structure required to accomplish the integration of electric power sources into the original design or the conversion. Although the discussion is directed to a passenger car with a monocoque structure, the present invention is applicable to all vehicles whether they are passenger or cargo, monocoque or frame construction, four-wheeled or ten-wheeled, etc. Likewise, the embodiment of the energy source containment unit discussed is only illustrative, therefore it should be understood that the present invention can be applied to any embodiment of an energy source containment unit used in the original design or conversion of a vehicle.

Generally speaking, commercially available vehicles have a vehicle primary structure to which are mounted the suspension systems, the exterior body panels, the propulsion system, the fuel system, the electrical system, and virtually all other components necessary to the operation of a self-propelled vehicle. The suspension system normally includes two pairs of wheels, each pair may be mounted on a corresponding axle—the two pairs of wheels are spaced from one another in the direction of travel for the vehicle. Typically, the vehicle primary structure for a vehicle extends between the two sets of wheels and is one of two types: a frame system or a monocoque system.

In a frame system, typically a pair of longitudinally extending structural members are laterally spaced from one another by two, three, or more transverse elements. The longitudinally extending members are typically nearly symmetrical with respect to a vertical longitudinal plane between them. In a monocoque system, various components of the vehicle, such as the payload compartment floor, the body panels, the engine firewall, the roof, and the door frames, are united together into an integral assembly where all those components participate in sharing force loads.

To produce an electric-powered vehicle or convert a conventional internal combustion engine-powered vehicle to an electrically-powered vehicle, the internal combustion engine is naturally replaced by a suitable electric motor. In addition, a source of electric energy must be provided on the vehicle. This source is typically a plurality of batteries consisting of electrochemical storage cells whose weight typically ranges from 20% to 65% of the overall vehicle weight including battery weight. More commonly, the desirable weight ranges from 30% to 50% of the overall vehicle weight, depending on battery and vehicle construction. Depending on the specific type of electric drive system used and on the size of the vehicle, the total energy source voltage typically ranges from 24 to 800 volts or higher. Typically, the peak current drawn is several hundred amps, which yields electric power levels typically in the range of 10–200 KW. For urban ranges of 50–100 miles, a typical amount of total energy stored varies from about 10 to about 25 KW hrs (for lead acid batteries). This is dependent upon, among other things, the vehicle size, mass, battery technology (such as lead acid, NiMH, NiCad, lithium polymer or numerous others) and vehicle mission. Vehicle stored energy could range from one to several hundred KW hours or more.

The electrical arrangement of the plurality of batteries and cells is typically a series/parallel arrangement where batteries are configured into a series of strings which provides for the desired voltage, typically between 100 and 400 volts. Any multiple of these battery strings can be placed in parallel to obtain the desired level of energy storage, power, or weight. Typical power requirements are 7 to 15 watts per pound of vehicle weight. Configurations described above would provide for vehicle acceleration adequate for use on public roads and highways and for a range of 50 to 100 miles on a single charge. That source of electric energy could also be provided by a plurality of batteries which may be advanced chemical storage batteries, fuel cells, flywheels, or the like. Where storage batteries are to be used, an array of batteries is often required to meet the requirements for efficiency, operating range, peak power, time between recharges, and the like.

Figure 1:
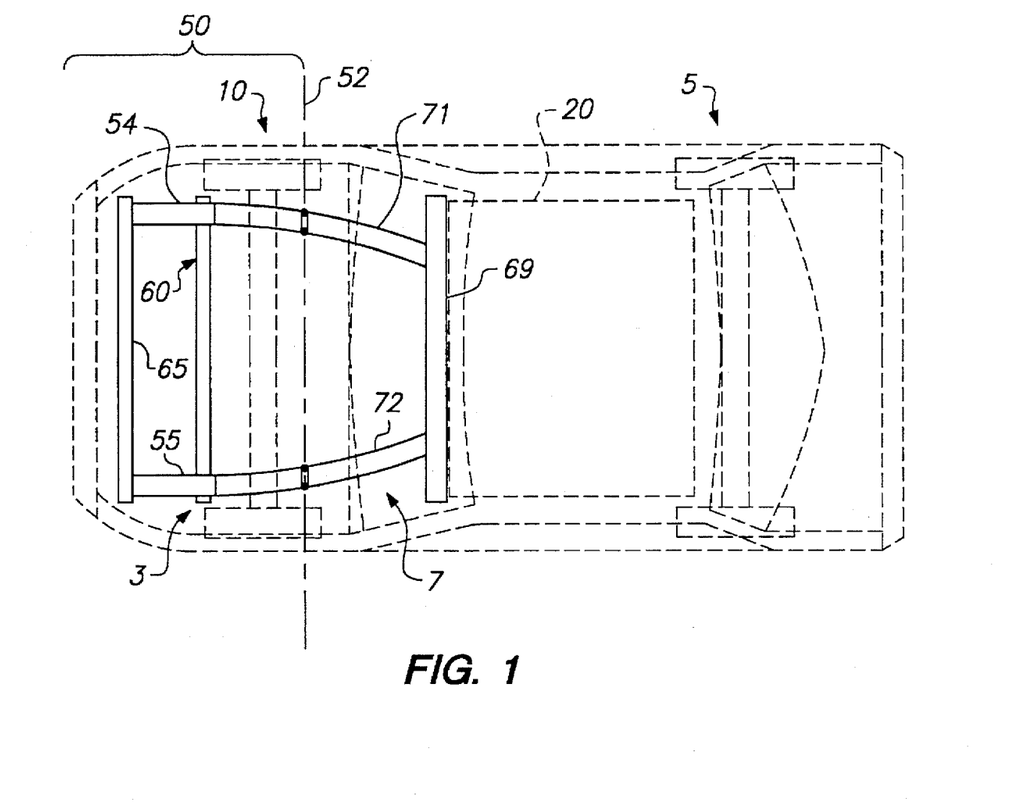
FIG. 1 is a top plan view of an electrically-powered vehicle having a dual unit crash energy management structure.
Figure 2:
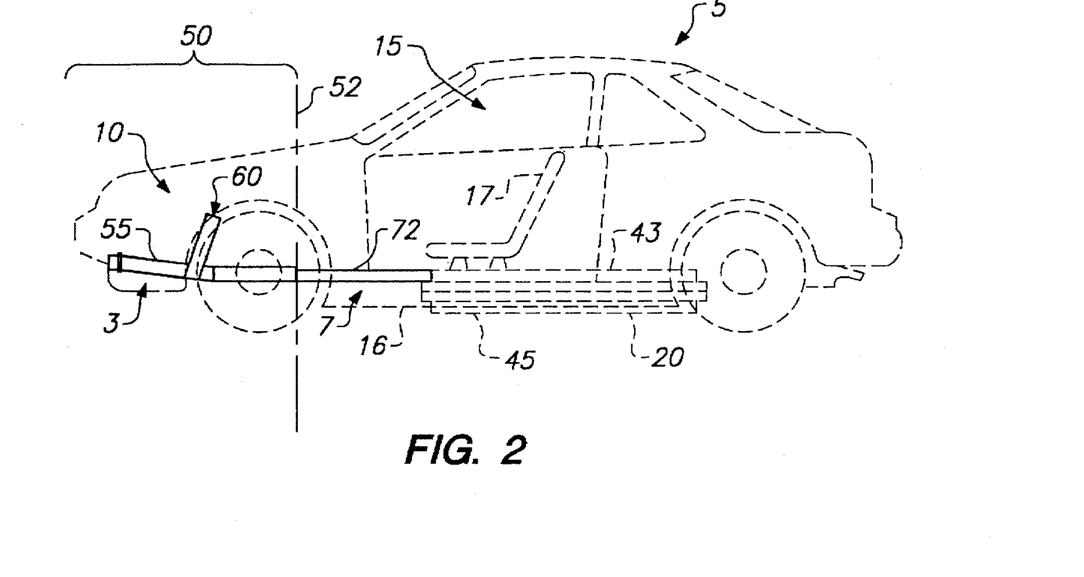
FIG. 2 is a left side elevational view of the vehicle in FIG. 1.

A vehicle using a monoceque construction for its vehicle primary structure is generally illustrated in FIGS. 1 and 2. Generally, the monocoque construction is found in passenger vehicles. In a vehicle 5 where the vehicle primary structure is a monocoque system, the floor of the payload compartment typically carries a substantial portion of the structural loads. When such avehicle is to be designed or retrofitted with an electrical drive system and an electrical energy supply, an energy source containment unit 20 is preferably located near the center of gravity and at a low position in the monocoque structure vehicle 5. The energy source containment unit 20 is positioned below the payload compartment, between the front and rear wheels and laterally within the contour of the vehicle.

The energy source containment unit 20 is sized to hold the required number of batteries. This condition may mean that any number up to fifty or more batteries are contained in the unit 20. Typically, the energy source elements are batteries of the lead-acid storage cell type, although other batteries such as the nickel-cadmium type, nickel metal hydride, lithium polymer or those employing an electrolyte composed of a plastic doped with sulfate, etc. can be used. Preferably, the energy sources are relatively maintenance-free batteries.

The energy source containment unit 20 is located at the bottom of a payload compartment 15. This position relative to the payload compartment is advantageous for several reasons. In the event of a frontal impact, the considerable mass associated with the energy source elements is unlikely to intrude on or impact the payload compartment 15 thereby reducing the risk of injury to occupants. Moreover, given the considerable mass of the energy source containment unit 20, placing it at a low elevation in the vehicle 5 enhances stability of the vehicle against tipping in response to lateral forces, such as might be incurred from lateral impacts or from high-speed turns. Furthermore, the low position of the unit 20 can be established such that little effect, if any, occurs to the ground clearance of the vehicle. Likewise, with the energy source containment unit 20 mounted low in the vehicle it is easily accessible from beneath the vehicle when it is necessary to service or replace the energy source elements therein.

It will also be noted that the energy source containment unit 20 is positioned between the from wheels and the rear wheels of the vehicle 5. Should the vehicle 5 encounter either frontal or rear-end impact, the energy source containment unit 20 is located in a more protected position than would exist if it extended beyond the position of the wheels or axles. Moreover, those skilled in the art will appreciate that the turning characteristics of a vehicle are, in part, a function of the moment of inertia of the vehicle about a vertical axis through the center of gravity. Thus, by locating the energy source containment unit 20 between the wheels and at about the location of the vehicle center of gravity, the additional mass associated with the energy source containment unit 20 is concentrated in a location where its effect on turning characteristics of the vehicle will be substantially reduced or minimized as contrasted with additional mass not so located.

The battery mass, because it can be a significant portion of the overall vehicle mass, may significantly change the mass distribution in the vehicle and therefore the location of the center of gravity. The location shown in FIGS. 1 and 2 (i.e. centrally fore to aft and side to side along with a low vertical position) provides for adequate vehicle dynamic performance.

To install the energy source containment unit 20 in a vehicle 5 having a monocoque structure, a corresponding portion of the payload compartment floor is first removed. The energy source containment unit 20 is then attached to the monocoque structure 16 in place of the floor portion (a structural member or panel) that has been removed.

In the illustrated embodiment, the energy source containment unit 20 is attached to the monocoque structure 16 so that the top of the unit 20 becomes a permanent replacement for the removed portion of the floor pan. The occupant seats 17 are attached to the top of the unit 20. Ordinarily, the energy source containment unit 20 does not change the location or the height of the driver and passenger seats in the payload compartment 15. Nevertheless, it may be necessary in some embodiments to adjust the location of the seats, but with only minimal effect on the occupants of the vehicle and such embodiments are within the scope of this present invention.

Because a monocoque structure requires a permanent replacement for the removed portion, the energy source containment unit 20 is preferably designed as a "clam shell" type construction having a top or upper shell 43 mated with a bottom or lower shell 45. More particularly, the top shell 43 can be permanently attached to the monocoque structure 16 by suitable securing means to replace the floor portion that was removed. The top shell can be attached by welding, or by more conventional attachment devices such as tabs, extrusions, flanges, bolts, pins, or the like that are generally known to one of ordinary skill in the art. Moreover, the top shell 43 may be provided with a peripherally extending flange that can function as the attachment to the vehicular structure and which defines a parting line between the top shell 43 and the bottom shell 45. An electrically insulating material may be placed between the extending flange and the vehicle structure to provide electrical isolation. The electrically insulating material can also prevent galvanic corrosion if dissimilar materials are used in the vehicle body and containment structure.

The energy source containment unit 20 is constructed of material having sufficient thickness and strength (i) to support the weight of the energy sources, (ii) to accommodate the normal operating stresses of the monocoque vehicle primary structure 2, (iii) to retain the batteries from being dislodged from the unit in the event of a crash, and (iv) to withstand road loads, such as those arising from hitting a pothole in the road. Moreover, the enclosure is effective to contain electrolyte or other battery components.

The strength and stiffness of the energy source containment unit 20 depend on many factors including: vehicle size; vehicle weight; number of energy source elements needed; weight of individual batteries; dynamic forces to which the vehicle may be subjected; vehicle handling requirements; and the like. These factors are generally known by one of ordinary skill in the art and can be determined without undue experimentation.

As shown in FIGS. 1 and 2, crush zone 50 (also known as the crumple zone) is generally forward of line 52 which represents a "hard point" in the vehicle primary structure. A "hard point" is a very rigid portion of the vehicle that is designed generally not to crumple or move in the event of a crash. In a monocoque-supported vehicle, the hard point is generally the location where the monoceque is attached to the suspension system. In other words, it is where the "feet" of the monocoque sit on the suspension system. In any given vehicle, whether of monocoque or frame construction, the hard point may be at a different location than is shown. The location of line 52 relative to the vehicle is only shown for illustration purposes. In actual applications of the present invention in different vehicle types, the hard point may be any of a number of locations.

In operation, as vehicle 5 collides with a frontal obstacle, crumple zone 50 compresses to a fraction of its original length while converting kinetic energy from the collision into deformation work. The conversion of the kinetic energy of the vehicle to deformation work done to the vehicle structure, molding, headlights, bumper, etc. reduces the amount of energy that is transmitted through the structure to the occupants. In addition, the controlled deformation of crush zone 50 helps to decelerate vehicle 5 by a rate survivable by the occupants.

Because of the substantial mass added to the vehicle by the energy source containment unit and associated batteries, deformable crash energy management structure 3 is added to crush zone 50 to augment the strength of the crush zone. Without the deformable crash energy management structure in an electric-powered vehicle or added to a converted vehicle, the vehicle will begin to crumple after hitting an object but will not decelerate as much as it is supposed to because of the additional mass. The vehicle will continue to the back of the crumple zone at a very fast rate until all of the structure and components that are supposed to crumple are completely crushed, then either as the hard point strikes the object the vehicle will come to a very abrupt stop and the acceleration of the occupants will go very high thus causing fatal injury or the payload compartment crushes forward into the hard point thereby causing intrusion of the steering wheel, instrument panel, and other components into the volume occupied by passengers and leading to contact injury or death.

Generally, deformable crash energy management structure 3 is a structure of predetermined strength and toughness (i.e., compressibility) that is located adjacent to or at least partially within the crush zone to increase the crush force that the vehicle exerts on an object in the event of a collision. In this way, the deformable crash energy management structure compensates for the additional mass of the energy source containment unit and the batteries so as to increase the effectiveness of the crumple zone. In other words, the addition of deformable crash energy management structure 3 creates more structure for the additional kinetic energy (created by the additional mass) to do "work on" thus allowing the vehicle to decelerate at a crash survivable rate.

For a conventional vehicle, the crush force (F) equals the vehicle mass (m) times a desired acceleration (a) (i.e., the desired deceleration). After the vehicle has been converted, the mass increases (for illustrative purposes) to 1.5 times the original vehicle mass. Because it is desired to keep the acceleration of the occupants at the previous rate, the crush force must increase. The addition of the deformable crash energy management structure accomplishes that increase in the crush force. The deformable crash energy management structure has a front end located adjacent to the front of the vehicle and a rear end attached to a "hard point" of the vehicle such that the deformable crash energy management structure can compress without moving backward relative to the hard point.

The permissible deceleration rate on dead stop from any speed of travel will be governed by the tolerance of the most sensitive component present, namely the passengers, with the given set of restraint systems such as seat belts and/or airbags and the given environment potentially including a padded knee bolster, padded steering wheel, collapsible steering column, and padded instrument panel. Typical peak accelerations observed in the payload compartment range from 20 G's to 40 G's in a 30 MPH impact with a rigid barrier, with the specific vehicle characteristics depending on its size, type, loading, and engineering sophistication.

Practically, this means that the deceleration of a passenger vehicle should take place over a sufficient distance that the crush force decelerates the payload compartment at the most constant rate possible, avoiding spikes which could promote injury to the occupants. The crash energy management structure may be designed to crush at more than one constant-force level over various subregions to improve performance over a range of impact speeds. Accordingly, deformable crash energy management structure 3 is preferably designed to distribute the principal zones of energy absorption at the leading side (i.e., the front of the vehicle), with progressively easing absorption as the remaining kinetic energy of the vehicle is progressively reduced so as to prevent intrusion even in the case where the crushable part of the crash energy management structure is completely crushed in a high speed impact. The shock absorption attainable in this manner should suffice to prevent death or fatal injuries to persons in a collision at the normal operating speed of about 30 miles per hour, and even to provide a substantial margin of safety beyond that speed.

The middle portion of deformable crash energy management structure 3 produces localized deformations through longitudinal rails 54,55 to secure a continuously yielding high energy absorbent design, adverse to sudden breaks. The localized deformations are produced by constructing longitudinal rails 54,55 of predetermined strength and toughness (i.e., compressibility). The rails compress or collapse on themselves along their length during deformation. It is generally known by one of ordinary skill in the art how to select material types and dimensions that will buckle in localized deformations in response to desired conditions. In some designs, only one longitudinal rail centrally located is required. Likewise, some designs can use more than two longitudinal rails.

Figure 3:
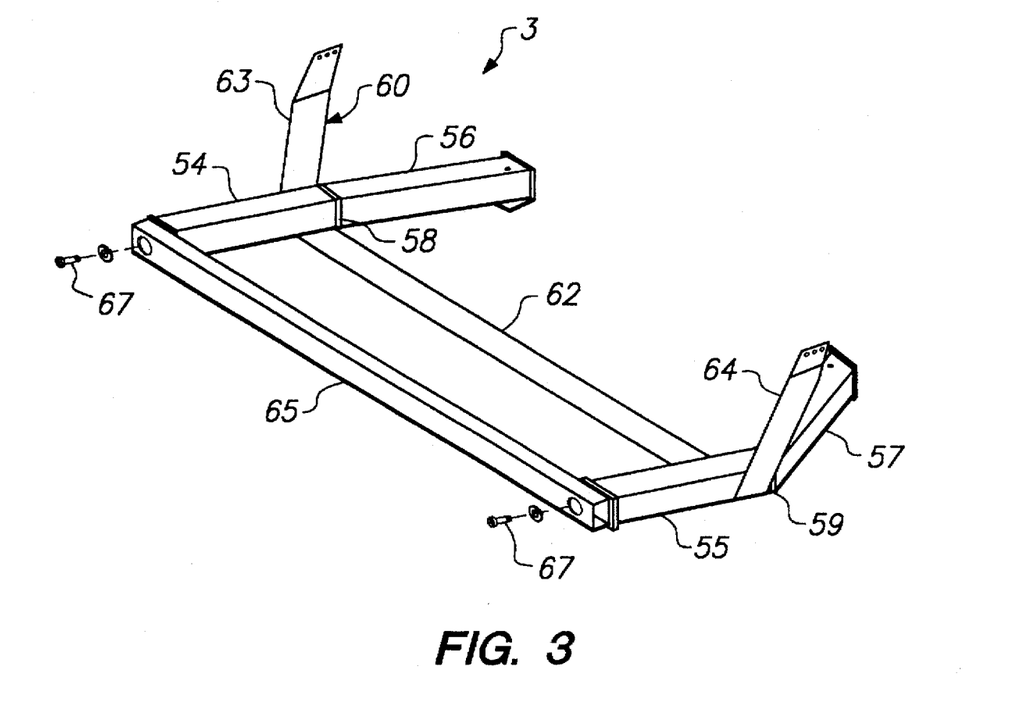
FIG. 3 is a perspective view of one embodiment of a deformable crash energy management structure in accordance with the present invention.
Figure 4:
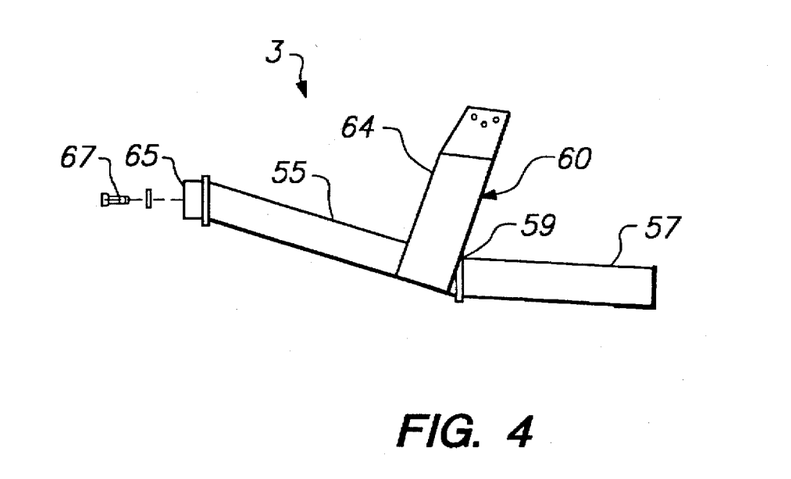
FIG. 4 is a left side elevational view of the deformable crash energy management structure in FIG. 3.
Figure 5:
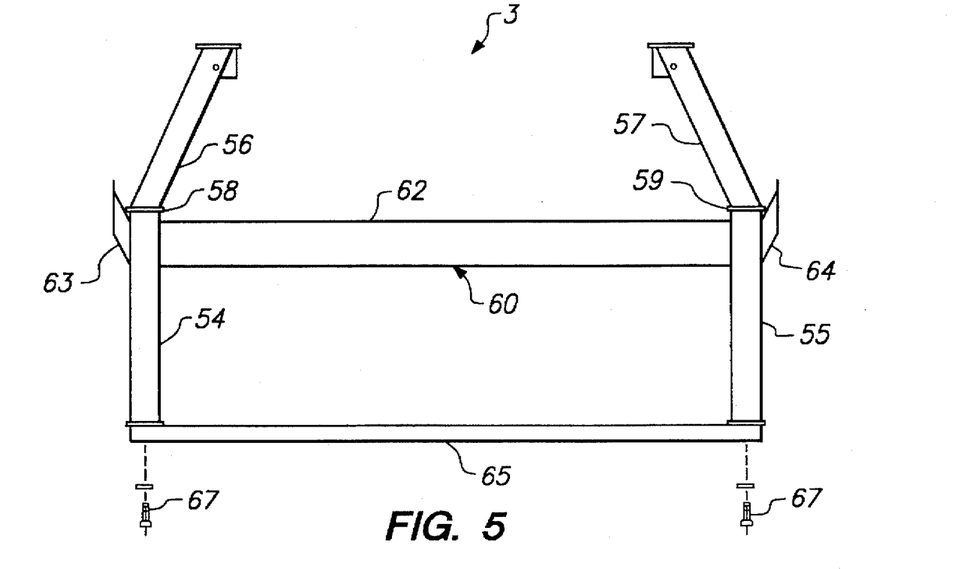
FIG. 5 is a top plan view of the deformable crash energy management structure in FIG. 3.

For the embodiment illustrated in FIGS. 3–5, longitudinal rails 54,55 including angled portions 56,57 are constructed of 16 gauge, 2 inch by 2 inch mild steel tubing. The front portions and angled portions are welded together at joints 58,59 but can be connected by other methods recognized by those of ordinary skill in the art.

As shown in FIG. 5, longitudinal rails 54,55 preferably have angled portion 56,57, respectively, so that deformable crash energy management structure 3 fits into the open area within the existing structure of vehicle 5. In this way, adequate room is left for incorporating necessary equipment or no existing structure of the vehicle has to be removed, relocated, etc. in order to accommodate the deformable crash energy management structure. The deformable crash energy management structure does not intrude upon the existing space and basically outlines the underhood area of the vehicle so that it is still easy to service the vehicle. Not all vehicles require an angled portion. Likewise, some vehicles may require different configurations for the deformable crash energy management structure all of which are encompassed by the present invention. Moreover, it will be readily understood that the particular shape of the deformable crash energy management structure can be modified to conform to other vehicle configurations.

If angled portions 56,57 are present, as in the present embodiment, then preferably support member 60 is attached around deformable crash energy management structure 3 in the vicinity of joints 58,59. Support member 60 essentially acts as a tension strap or restraining member that prevents longitudinal rails 54,55 from bending outward or downward (i.e., bowing out) at the joints instead of locally deforming along their length. The support member 60 in FIGS. 3–5 consists generally of connecting portion 62 connecting longitudinal rail 54 to longitudinal rail 55 and attaching portions 63,64 for attaching to the inside of vehicle 5. Support member 60 is constructed of 16 gauge, 3 inch wide C1010 steel or its equivalent. The support member can also be two separate rigid members (one for each side) that are connected between the longitudinal rail and the inside of the vehicle.

Deformable crash energy management structure 3 can also have cross member 65 that extends transversely between longitudinal rails 54,55 and adjacent to the front of vehicle 5. Cross member 65 acts to distribute impact loads across the vehicle and to direct the impact loads to additional load paths along the vehicle, such as through the longitudinal rails 54,55, in the event the vehicle impacts an object. The addition of longitudinal rails 54,55 and cross member 65 is advantageous for several reasons. For example, if vehicle 5 was to encounter a localized or concentrated impact, such as from a tree, post, sign, etc., in the center of the vehicle, instead of the forces being centered in the vehicle such that the post slices deep into the vehicle crumple zone 50, the cross member 65 distributes that localized impact across the vehicle to the longitudinal rails 54,55. In this way, the forces of the impact will be absorbed by the structure in the crush zone and the deformable crash energy management structure as if a wide object struck the front of the vehicle. In addition, monocoque constructed vehicles generally have two load paths or "rails" extending along the length of the vehicle. These load paths are commonly referred to as the upper rail and the midline rail. These rails are generally high in the vehicle because the center of mass of a monocoque vehicle is generally high. With the addition of longitudinal rails 54,55, there is a "lower rail" that compensates for the fact that the center of gravity of the vehicle is lower due to the energy source containment unit being located low in the vehicle. The "lower rail" also lowers the load path or crash line of the vehicle so that the forces are directed below the payload (i.e., occupant) compartment for additional safety.

In the embodiment illustrated in FIGS. 3–5, cross member 65 is 16 gauge, 2 inch by 1 inch steel tubing. Cross member 65 can be attached to longitudinal rails 54,55 by bolts and washers 67, by welding or other known methods. The forward portions of longitudinal rails 54,55 are angled upward to a convenient location in the vehicle, but these portions may have other configurations, including straight, depending on the vehicle type in which they are installed.

Removing a portion of the floor of the monocoque structure and locating the energy source containment unit 20 below the payload compartment 15 has all of the advantages mentioned previously. However, because the seats 17 are attached to the energy source containment unit 20 there is a risk that the occupants will be injured in the event of a frontal crash by being projected forward into the steering column, instrument panel, windshield, firewall, etc. if the energy source containment unit was to move forward relative to its location in the vehicle or relative to the payload compartment. In order to prevent the energy source containment unit (thus the occupant's seats) from moving forward, in one embodiment of the crash energy management structure, there is provided rigid crash energy management structure 7. The rigid crash energy management structure will maintain the spacing between the occupant's seats and the instrument panel for the desired crash survivable environment.

As shown in FIGS. 1 and 2, line 52 represents a "hard point" in the vehicle primary structure as discussed above. With respect to the present embodiment of the invention, the hard point is generally the location where the monocoque is attached to the suspension system. In any given vehicle, whether of monocoque or frame construction, the hard point may be at a different location than is shown. The location of line 52 relative to the vehicle is only shown for illustration purposes. In actual applications of the present invention in different vehicle types, the hard point may be any of a number of locations. For example, the hard point can be the location where the monocoque is attached to the rear suspension system.

In the embodiment illustrated in FIGS. 1 and 2, rigid crash energy management structure 7 is located in front of energy source containment unit 20. However, the rigid crash energy management structure can be located behind the energy source containment unit and attached to a rear hard point. Likewise, the crash energy management structure can consist of more than one rigid crash energy management structure. For example, one in front of and one behind the energy source containment unit.

In operation, as vehicle 5 collides with a frontal obstacle, crumple zone 50 compresses to a fraction of its original length while converting kinetic energy from the collision into deformation work. Either concurrently or subsequently, energy source containment unit 20 will try to continue to move forward (even though the vehicle is decelerating) due to the relatively large mass of the batteries. Rigid crash energy management structure 7 shown in FIGS. 1 and 2 is located between crush zone 50 and energy source containment unit 20 to prevent the energy source containment unit from moving toward the crush zone in the event the vehicle impacts an object.

Figure 6:
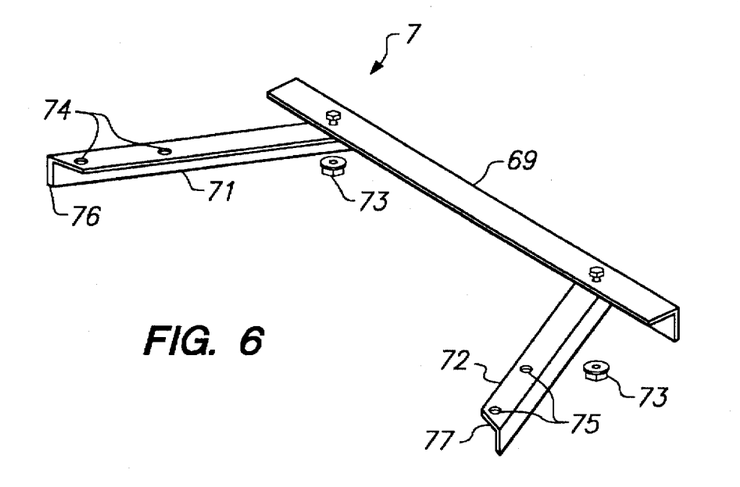
FIG. 6 is a perspective view of one embodiment of a rigid crash energy management structure in accordance with the present invention.
Figure 7:
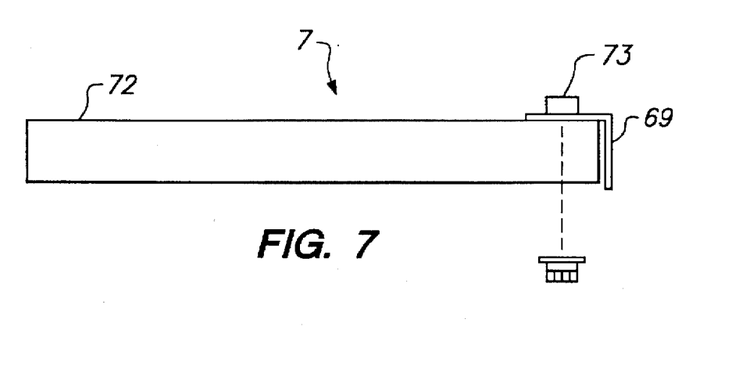
FIG. 7 is a left side elevational view of the rigid crash energy management structure in FIG. 6.

Rigid crash energy management structure 7 abuts energy source containment unit 20 in FIGS. 1 and 2, however the rigid crash energy management structure can be attached to the unit or spaced from the unit depending on what requirements the design of the vehicle structure dictates or by what design is desired. In FIGS. 6 and 7, rigid crash energy management structure 7 comprises transverse member 69 which extends across the front of the energy source containment unit and connecting members 71,72 which connect to the hard point (i.e., rigid portion) of the vehicle. In some designs, only one connecting member centrally located relative to the transverse member is required. Likewise, some designs can use more than two connecting members. Transverse member 69 distributes the inertial forces of the energy source containment unit across the width of the vehicle in the event there is an oblique impact with the vehicle (as opposed to a head-on impact). Other embodiments can exist however. For example, transverse member 69 can abut the hard point of the vehicle and connecting members 71,72 can be attached to the energy source containment unit or transverse member 69 does not have to be present such that connecting members 71,72 extend between the hard point and the energy source containment unit.

In the embodiment shown in FIGS. 6 and 7, transverse member 69 is constructed of 1½ inch by 1½ by 3/16 inch angle steel stock and connecting members 71,72 are constructed of 1½ by 1¼ inch by 3/16 inch angle steel stock. Transverse member 69 can be connected to connecting members 71,72 by bolts and nuts 73, by welding or by other known means. Connecting members 71,72 have mounting holes 74,75, respectively, for mounting rigid crash energy management structure 7 to the hard point of the vehicle. Existing suspension bolts or components can be used through mounting holes 74,75 or other bolts, or means can be used. Connecting members 71,72 can also have angled ends 76,77 for fitting into or mating with existing vehicle structure.

Rigid crash energy management structure 7 can be comprised of many different elements and be in many different configurations. Essentially, the rigid crash energy management structure comprises elements that are stiff enough to prevent the energy source containment unit from moving relative to the hard point of the vehicle on deceleration of the vehicle from 30 miles per hour to 0 miles per hour, and more preferably on deceleration from 35 miles per hour to 0 miles per hour when the vehicle strikes an immovable object or another vehicle of similar mass head on. The rigid crash energy management structure can also be located behind the energy source containment unit or rigidly attached to the front of the unit and to a hard point so as to prevent the unit from moving relative to the payload compartment in a rear end collision.

A vehicle using frame construction as its vehicle primary structure can also be designed as an electric vehicle or converted to electrical power. The vehicle frame typically includes a pair of elongated side members or side rails which normally are nearly symmetrical about a longitudinal plane passing through a vertical axis intersecting the vehicle center of gravity. Typically, the rails extend along the length of the vehicle in the direction the vehicle travels. To space the side rails from one another, the frame includes at least two transverse structural supports or cross-members. A ladder-type frame will generally include three or more such cross-members. The energy source containment unit is attached to each of the two side rails of the frame.

To install or retrofit a vehicle with the energy source containment unit, a structural member of the frame, namely a cross-member may be removed. The energy source containment unit is positioned between the side rails. This location of the energy source containment unit is also advantageous. By keeping the energy source containment unit between the side rails, the unit is further protected from lateral impacts on the vehicle by the side rails while providing additional stiffness and rigidity to the vehicle structure. The energy source containment unit becomes a load bearing member of the frame in addition to being a support for the batteries.

Other embodiments of the deformable crash energy management structure or rigid crash energy management structure, or both can be incorporated into the frame-constructed vehicle in essentially the same manner as described above with one principle difference being that the crash energy management structure can be attached to the frame at many locations. In addition, the occupant's seats may not be attached to the energy source containment unit but preventing the energy source containment unit from moving forward into the occupant's compartment is still important. Likewise, augmenting the crush force of the vehicle is still important for maintaining or improving the vehicle's crashworthiness.

The foregoing has described the principles, preferred embodiments and modes of operation of the present invention. However, the invention should not be construed as limited to the particular embodiments discussed. Instead, the above-described embodiments should be regarded as illustrative rather than restrictive, and it should be appreciated that variations may be made in those embodiments by workers skilled in the art without departing from the scope of present invention as defined by the following claims.

The invention claimed is:

1. A vehicle converted from internal combustion engine power to electrical power, said vehicle comprising:
   a vehicle primary structure having
      a crush zone collapsible upon impact of the vehicle with an object and a hard point which does not collapse or move upon impact of the vehicle with an object;
      a payload compartment positioned behind at least a portion of the crush zone;
      an energy source containment unit located at the bottom of the payload compartment and enclosing a plurality of individual batteries; and
      a crash energy management structure positioned between the energy source containment unit and the hard point of the vehicle primary structure and attached to the hard point to prevent the energy source containment unit from moving relative to the payload compartment in the event the vehicle impacts an object.

2. The vehicle of claim 1 wherein said energy source containment unit is an integral structural element of the vehicle primary structure.

3. The vehicle of claim 1 wherein the crash energy management structure is a rigid structure located between the crush zone and the energy source containment unit to prevent the energy source containment unit from moving toward the crush zone of the vehicle in the event the vehicle impacts an object.

4. The vehicle of claim 3 wherein the crash energy management structure comprises:
   a transverse member extending across the front of the energy source containment unit; and
   at least one connecting member connecting the transverse member to a rigid portion of the vehicle primary structure;
   said transverse member distributes the inertial forces of the energy source containment unit across the width of the vehicle in the event there is an oblique impact with the vehicle.

5. The vehicle of claim 1 wherein the crash energy management structure abuts a first end of the energy source containment unit and is attached at a second end to a rigid portion of the vehicle primary structure to prevent the energy source containment unit from moving relative to the rigid portion of the vehicle primary structure in the event the vehicle impacts an object.

6. The vehicle of claim 5 wherein the crash energy management structure is located in front of the energy source containment unit.

7. The vehicle of claim 1 wherein:
   the vehicle primary structure is a monocoque structure; and
   the energy source containment unit includes means for securing the energy source containment unit in the vehicle to replace at least one structural member of the vehicle.

8. The vehicle of claim 7 wherein the energy source containment unit comprises an upper shell and a lower shell, the upper and lower shells being connected along a parting line, and one of the upper and lower shells being an integral part of the monocoque structure.

9. A vehicle converted from internal combustion engine power to electrical power, said vehicle comprising:
- a vehicle primary structure having a crush zone collapsible upon impact of the vehicle with an object;
- a payload compartment positioned behind at least a portion of the crush zone;
- an energy source containment unit located at the bottom of the payload compartment and enclosing a plurality of individual batteries;
- a crash energy management structure positioned adjacent to the energy source containment unit and attached to the vehicle primary structure to prevent the energy source containment unit from moving relative to the payload compartment in the event the vehicle impacts an object; and
- at least one occupant seat attached to the energy source containment unit.

10. A vehicle being electrically-powered comprising:
- a vehicle primary structure having
- a crumple zone collapsible upon impact of the vehicle with an object and a hard point which does not collapse or move upon impact of the vehicle with an object;
- a payload compartment positioned behind at least a portion of the crumple zone;
- an energy source containment unit located at the bottom of the payload compartment and enclosing a plurality of individual batteries; and
- a crash energy management structure positioned between the energy source containment unit and the hard point of the vehicle primary structure and attached to the energy source containment unit to prevent the energy source containment unit from moving relative to the payload compartment in the event the vehicle impacts an object and to increase the effectiveness of the crumple zone of the vehicle.

11. The vehicle of claim 10 wherein said energy source containment unit is an integral structural element of the vehicle primary structure.

12. The vehicle of claim 10 wherein said crash energy management structure comprises:
- a stiff structure located adjacent the energy source containment unit to prevent the energy source containment unit from moving toward the crumple zone of the vehicle in the event the vehicle impacts an object; and
- a collapsible structure of predetermined compressibility located in the crumple zone of the vehicle to increase the crush force of the vehicle in the event the vehicle impacts an object.

13. The vehicle of claim 12 wherein said stiff structure comprises:
- a transverse beam across the front of the energy source containment unit; and
- at least one connecting member securing the transverse beam to a fixed portion of the vehicle primary structure;
- said transverse beam distributes the inertial forces of the energy source containment unit across the width of the vehicle in the event there is an oblique impact with the vehicle.

14. The vehicle of claim 12 wherein the collapsible structure is coupled at a first end to the front of the vehicle and at a second end to a fixed portion of the vehicle primary structure to compensate for the added mass of the energy source containment unit by assisting the crumple zone in decelerating occupants in the vehicle at a desirable rate.

15. The vehicle of claim 12 wherein the collapsible structure comprises:
- a cross member extending transversely adjacent to the front of the vehicle so as to distribute impact loads across the vehicle and to direct the impact loads to additional load paths along the vehicle in the event the vehicle impacts an object; and
- at least one crushable member of predetermined compressibility attached at a first end to the cross member and at a second end to a fixed portion of the vehicle;
- said collapsible structure is located in the crumple zone of the vehicle to increase the crush force of the vehicle in the event the vehicle impacts an object.

16. The vehicle of claim 12 wherein the collapsible structure comprises:
- a cross member extending transversely adjacent to the front of the vehicle so as to distribute impact loads across the vehicle and to direct the impact loads to additional load paths along the vehicle in the event the vehicle impacts an object;
- at least two crushable members of predetermined compressibility attached at their first ends, respectively, to the ends of the cross member and at their second ends, respectively, to a fixed portion of the vehicle; and
- a restraining member attached to the crushable members such that the crushable members are urged to fold in localized deformations along the crushable members;
- said collapsible structure is located in the crumple zone of the vehicle to increase the crush force of the vehicle in the event the vehicle impacts an object.

\* \* \* \* \*